UNITED STATES PATENT OFFICE.

GEORG WILHELM MEISER, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY.

PROCESS OF MAKING ALKALI-METAL OXIDS.

No. 828,759.     Specification of Letters Patent.     Patented Aug. 14, 1906.

Application filed October 14, 1902. Serial No. 127,309.

*To all whom it may concern:*

Be it known that I, GEORG WILHELM MEISER, doctor of philosophy and chemist, a subject of the King of Bavaria, residing at Ludwigshafen-on-the-Rhine, in the Kingdom of Bavaria, Empire of Germany, have invented new and useful Improvements in Processes of Making Alkali-Metal Oxids, of which the following is a specification.

It has hitherto been impossible to prepare pure alkali-metal oxid having the composition represented by the formula $Na_2O$ or $K_2O$. All attempts to prepare such oxids have resulted in impure products. For instance, Beketof was only able to prepare a product containing thirty to sixty-six per cent. of $K_2O$. (See *Berichte* 14, page 2058.) Further, de Foucrand on account of the difficulty he found in preparing pure sodium oxid had to be content with a mixture of $Na_2O_2$ and $Na_2O$. (See *Comptes Rendus*, Vol. 128, page 1449; also, *Ber.*, Vol. XII, page 856; Vol. XVI, page 1854; Vol. XX, part 3, page 190.) In fact, so defective and uncertain has been our knowledge of this subject that in recent times it has been doubted whether such oxids exist at all. (See Erdmann, *Lehrbuch der Anorganischen Chemie*, third edition, 1902, page 516.) Further, the means hitherto employed in the attempts to obtain these oxids have necessitated the prolonged application of extraneous heat, and the vessels in which such reactions were carried out have been strongly attacked.

The present invention consists in preparing alkali-metal oxids which for practical purposes are pure without the employment of extraneous heat to any considerable extent.

According to this invention alkali-metal powder is intimately mixed with alkali-metal superoxid and the components are caused to react together. Such a mixture is conveniently obtained by grinding an alkali metal with a superoxid of an alkali metal. On exposure to air or by local warming—for example, by means of a match or hot wire—the mixture ignites. The mass then becomes red-hot, because of the heat of the reaction and without the aid of extraneous heat, and an alkali-metal oxid results. The reaction (which is preferably performed in the absence of air or oxygen or in the presence of an indifferent gas, so as to avoid the re-formation of alkali superoxid) takes place so quickly that practically no corrosion of the vessel in which it occurs can take place, and during the ignition the walls and bottom of the vessel may be cooled to further prevent the possibility of any such action of the materials on them as would render the product impure.

That the new products are practically pure and may be represented by the empirical formula $R_2O$ (where R represents an atom of an alkali metal, such as potassium or sodium) can easily be shown by analysis—for example, by carefully treating such product with water and titrating it with standard acid. Of course if a mixture of oxids $R_2O$ (say of sodium and potassium oxid) is being examined the proportion of the constituent metals must be allowed for in the well-known manner. The new products are fit without any further treatment for application in the manufacture of indigo by use in the caustic alkaline melt containing phenyl glycocoll.

The following example will serve to further illustrate the nature of this invention; but, as will be understood from the foregoing description of the scope of the invention, it is not confined to the precise conditions, apparatus, or materials specifically named in this example. The parts are by weight:

Example: Grind together in a ball-mill thirty-nine (39) parts of sodium peroxid and twenty-three (23) parts of metallic sodium. If air be excluded, no reaction, such as ignition of the sodium, takes place, and a mixture of sodium powder and powdered sodium peroxid results. Ignite the mixture obtained either in the mill itself or after having transferred the mixture to another vessel. The ignition can be effected by locally warming the mass, which then burns violently and melts. Should a part of the material in spite of the violent reaction remain unconverted, grind up the reaction mass again and heat it for from about one-quarter to half ($\frac{1}{4}$ to $\frac{1}{2}$) an hour, so that the powder shrinks together to a white compact mass. It then forms practically pure sodium oxid. In a similar manner potassium oxid can be prepared from potassium superoxid and metallic potassium.

There is claimed—

1. The process for the production of alkali-metal oxids which consists in mixing together the alkali metal with an alkali-metal peroxid and causing the resultant mixture to react and combine substantially under the heat of its own reaction.

2. The process for the production of alkali-metal oxids which consists in mixing together the alkali metal with an alkali-metal peroxid and causing the resultant mixture to react and combine substantially under the heat of its own reaction while cooling the vessel in which the reaction occurs.

In testimony whereof I have hereunto set my hand in the presence of two subscribing witnesses.

GEORG WILHELM MEISER.

Witnesses:
   ERNEST F. EHRHARDT,
   JACOB ADRIAN.